US011931311B2

(12) United States Patent
Truman et al.

(10) Patent No.: US 11,931,311 B2
(45) Date of Patent: Mar. 19, 2024

(54) HYDROTHERAPY APPARATUS GLAZING

(71) Applicant: Syspal Holdings Limited, Shropshire (GB)

(72) Inventors: Christopher John Truman, Shropshire (GB); Paul Easton Preece, Shropshire (GB)

(73) Assignee: Syspal Limited, Shropshire (GB)

( * ) Notice: Subject to any disclaimer, the term of this patent is extended or adjusted under 35 U.S.C. 154(b) by 372 days.

(21) Appl. No.: 17/244,010

(22) Filed: Apr. 29, 2021

(65) Prior Publication Data

US 2021/0338525 A1 Nov. 4, 2021

(30) Foreign Application Priority Data

Apr. 30, 2020 (GB) ..................................... 2006360

(51) Int. Cl.
*A61H 33/00* (2006.01)
*A63B 22/02* (2006.01)

(52) U.S. Cl.
CPC ......... *A61H 33/6005* (2013.01); *A63B 22/02* (2013.01); *A61H 2203/03* (2013.01); (Continued)

(58) Field of Classification Search
CPC ............ A61H 33/6005; A61H 2203/03; A61H 2203/0406; A61H 2009/0035; (Continued)

(56) References Cited

U.S. PATENT DOCUMENTS 1,046,813 A 12/1912 Laugenour
2,611,341 A 9/1952 Paris
(Continued)

FOREIGN PATENT DOCUMENTS

GB 659298 A 10/1951
GB 1168727 A 10/1969
(Continued)

OTHER PUBLICATIONS

Search Report for International Application No. EP 21171370, dated Sep. 29, 2021, 8 pages.
(Continued)

*Primary Examiner* — Joseph M Dietrich
*Assistant Examiner* — Michael T. Holtzclaw
(74) *Attorney, Agent, or Firm* — Boyle Fredrickson, S.C.

(57) ABSTRACT

A hydrotherapy apparatus comprises a tank, the tank comprising a panel arranged to form a wall of the tank, and an inner frame arranged to have the panel mechanically fixed to an outer side thereof, without bonding, so as to form a watertight seal. The inner frame may comprise a lower portion in a base region of the tank and two struts extending upward therefrom. The tank may further comprise a lower fixing section arranged to be mechanically connected to an outer surface of the lower portion of the inner frame, with a lower edge region of the panel therebetween, and two side fixing sections extending upward and each arranged to be mechanically connected to an outer surface of a respective strut of the struts of the inner frame, with a respective side edge region of the panel therebetween.

19 Claims, 6 Drawing Sheets

(52) U.S. Cl.
CPC .. *A61H 2203/0406* (2013.01); *A63B 2208/03* (2013.01); *A63B 2225/60* (2013.01)

(58) Field of Classification Search
CPC ........ A61H 2203/02; A61H 2201/0111; A63B 22/02; A63B 2208/03; A63B 2225/60; A61D 11/00
See application file for complete search history.

(56) References Cited

U.S. PATENT DOCUMENTS

| | | | | |
|---|---|---|---|---|
| 3,485,213 | A | 12/1969 | Scanlon | |
| 4,944,506 | A | 7/1990 | Keller et al. | |
| 5,100,127 | A * | 3/1992 | Melnick | A63B 22/0023 119/700 |
| 5,295,929 | A * | 3/1994 | Weisz | A63B 22/02 482/111 |
| 6,746,375 | B2 * | 6/2004 | Smith | A01K 15/027 119/700 |
| D606,205 | S | 12/2009 | Truman et al. | |
| 8,667,622 | B2 | 3/2014 | Truman et al. | |
| 2008/0004677 | A1 * | 1/2008 | Gay | A61H 23/04 4/584 |
| 2008/0271236 | A1 | 11/2008 | Truman et al. | |
| 2019/0134458 | A1 * | 5/2019 | Matin | A63B 71/022 |

FOREIGN PATENT DOCUMENTS

| | | | |
|---|---|---|---|
| JP | 2015130957 | A | 7/2015 |
| SU | 919679 | A1 | 4/1982 |
| WO | 2006085077 | A2 | 8/2006 |

OTHER PUBLICATIONS

Examination Report for Application No. GB2006360.8, dated Apr. 25, 2022, 2 pages.
Examination Report for Application No. GB2006360.8, filed Apr. 30, 2020, dated Dec. 10, 2020, 1 page.
Combined Search and Examination Report for International Application No. GB2006360.8, filed Apr. 30, 2020, dated Oct. 27, 2020, 4 pages.
Search Report for International Application No. GB2006360.8, filed Apr. 30, 2020, dated Oct. 26, 2020, 2 pages.
Examination Report for Application No. GB2006360.8, dated May 12, 2022, 1 page.

* cited by examiner

HYDROTHERAPY APPARATUS GLAZING

BACKGROUND

The invention relates to a hydrotherapy apparatus, and to a method of assembling (and disassembling) such a hydrotherapy apparatus. More specifically, the invention relates to a hydrotherapy apparatus comprising a tank arranged to contain a liquid (e.g. water), wherein the tank comprises one or more panels mounted on a frame. The tank may be arranged to contain a treadmill or other conveyer suitable for underwater use. In particular, but not exclusively, the invention relates to a hydrotherapy apparatus suitable for use by animals, and in particular domestic animals such as dogs, although apparatuses adapted for other uses, such as for human, equine or livestock use, may also be envisaged.

Treadmills are used in physiotherapy and exercise regimes for both humans and animals. The ability to use a treadmill underwater provides support to a user, which may be especially useful during post-injury or post-operative recovery, or to make exercise easier for those that are injured or have other health issues, such as being over-weight, having arthritis, etc. Most underwater treadmills are provided in a tank. The water is contained within the tank.

SUMMARY OF THE INVENTION

The invention is described below in relation to hydrotherapy treadmills, but the skilled person would appreciate that a hydrotherapy apparatus as described herein may not comprise a treadmill/conveyer, and may optionally comprise different exercise equipment instead of (or as well as) a treadmill.

In the prior art, tanks for hydrotherapy apparatus are generally formed by gluing panels—often glass panels—to the inside of a frame so as to form walls of the tank. Once the tank is filled with a liquid—usually water—for use, the pressure of the water pushes the panels outward against the frame, so reinforcing the seal provided by the glue (or equivalent sealant/bonding material).

According to a first aspect of the invention, there is provided a hydrotherapy apparatus comprising a tank arranged to hold a liquid. The tank comprises:

- a panel arranged to form a wall of the tank,
- an inner frame arranged to have the panel connected thereto, the inner frame comprising a lower portion in a base region of the tank and two struts extending upward therefrom;
- a lower fixing section arranged to be mechanically connected to an outer surface of the lower portion of the inner frame, with a lower edge region of the panel therebetween;
- two side fixing sections extending upward and each arranged to be mechanically connected to an outer surface of a respective strut of the struts of the inner frame, with a respective side edge region of the panel therebetween.

The skilled person would appreciate that "lower" and "upward" are defined with respect to the intended apparatus orientation in use The fixing sections are therefore arranged to clamp the panel to the inner frame.

The panel may form substantially an entire side of the tank—extending from one corner region of the tank to another. In other embodiments, more than one panel may be used for one side of the tank—for example for a long or wide tank. The one or more panel(s) may form at least substantially all of the wall on the given side of the tank (e.g. extending between struts of the frame).

The side fixing sections may be integral with, connected to, or adjacent (with or without a space therebetween) the lower fixing section, and may extend upward away from the lower fixing section.

The side fixing sections may extend upward away from the lower portion of the inner frame. The side fixing sections may contact the lower portion of the inner frame, or may be vertically spaced therefrom. In some embodiments, the lower fixing section and the side fixing sections may be provided as three portions of a single piece—i.e. they may be integral. The side fixing sections may extend upward from the lower fixing section, optionally at an angle of 90° or therearound.

The inner frame may comprise a ledge arranged to receive and support the lower edge region of the panel thereon.

The hydrotherapy may further comprise a top rail arranged to contact an outer surface of an upper edge region of the panel, and to be mounted onto the struts of the inner frame. The top rail may serve to reduce or prevent outward bowing of the panel resulting from water pressure when the tank is filled.

Each end of the top rail may be arranged to be screwed onto the top of a respective strut of the inner frame.

Each strut may be hollow and/or may comprise one or more indentations in an upper surface thereof. A downwardly-extending protrusion at each end of the top rail may be provided, and may be arranged to be engagingly received within the respective strut.

The inner frame may comprise more than two struts; for example four struts.

The hydrotherapy apparatus may further comprise one or more elastomeric seals. The or each elastomeric seal may be arranged to clip onto the inner frame, and may extend outwardly therefrom to contact the panel. The one or more elastomeric seals may therefore form a watertight seal between the panel and the inner frame.

The hydrotherapy apparatus may further comprise one or more external trims arranged to cover the fixing sections.

The hydrotherapy apparatus may comprise two panels. Each panel may be arranged to form one wall of an at least substantially cuboid tank—for example forming a pair of opposing walls. Each panel may be mounted to the inner frame in the same way. The inner frame may comprise four struts—two for each panel.

The inner frame may comprise a base and four struts extending upward therefrom. The base may be rectangular, and each strut may be located at a corner of the base.

The or each panel may be a glass panel.

The hydrotherapy apparatus may further comprise a conveyer located within the tank (e.g. for use as a treadmill). Additional or alternative exercise apparatus may be provided in alternative embodiments.

According to a second aspect, there is provided a kit of parts for constructing a hydrotherapy apparatus comprising a tank. The kit of parts comprises:

- an inner frame arranged to have a panel connected thereto so as to form a wall of the tank, the inner frame comprising a lower portion in a base region of the tank and two struts extending upward therefrom;
- a lower fixing section arranged to be mechanically connected to an outer surface of the lower portion of the inner frame, and arranged to receive a lower edge region of the panel therebetween in use;
- two side fixing sections, each arranged to be mechanically connected to an outer surface of a respective strut of the struts of the inner frame so as to extend upwards away from the lower portion of the inner frame, and arranged to receive a respective side edge region of the panel therebetween in use.

The panel may be provided separately, e.g. acquired from a local supplier, or may be provided as part of the kit.

The hydrotherapy apparatus may have any or all of the features described with respect to the first aspect.

According to a third aspect, there is provided a method of assembling a hydrotherapy apparatus comprising a tank, the method comprising mechanically connecting a panel to the outside of an inner frame of the tank so as to form a wall of the tank. The panel may be clamped in place using externally-positioned fixing sections.

The method may comprise clipping one or more elastomeric seals to the inner frame. The one or more elastomeric seals may be arranged to extend outwardly from the inner frame so as to contact the panel once fitted.

The method may comprise:

positioning a lower edge of the panel against an outer surface of the inner frame (for example, on a ledge provided by the inner frame);

positioning side edge regions of the panel against outer surfaces of respective struts of the inner frame extending upward from the lower portion thereof; and mechanically connecting one or more fixing sections to the lower portion and struts of the inner frame so as to clamp the panel between the fixing section(s) and the inner frame.

The method may comprise connecting a top rail between two struts of the inner frame. The top rail may be arranged to contact an outer surface of an upper edge region of the panel.

The method may not include the application of any adhesive, sealant, or heat or pressure treatment to bond the panel to the inner frame.

The method may be used to construct a hydrotherapy apparatus as described with respect to the first aspect.

The method may be performed using the kit of parts as described with respect to the second aspect.

According to a fourth aspect, there is provided a hydrotherapy apparatus comprising a tank, the tank comprising:

a panel arranged to form a wall of the tank; and an inner frame arranged to have the panel mechanically fixed to an outer side thereof, without bonding, so as to form a watertight seal.

The hydrotherapy apparatus may be as described with respect to the first aspect.

According to a fifth aspect, there is provided a kit of parts for constructing a hydrotherapy apparatus comprising a tank, the kit of parts comprising:

an inner frame arranged to form a base of the tank and to have one or more panels mechanically fixed to an outer side thereof so as to form walls of the tank, without bonding, so as to form a watertight seal.

The kit of parts may be as described with respect to the second aspect.

The tank may therefore be assembled with no bonding between the one or more panels, which are often made of glass, and the frame. In particular, no adhesive, sealant, heat-treatment, pressure-bonding (e.g. thermo-compression bonding or diffusion bonding) may be used, and no new chemical bonds formed. Instead, the panels may be sealed to the tank by purely mechanical means.

As the panels are connected to an outer surface of the tank frame, water pressure from within the tank (once filled) exerts a pressure on the panels which tends to push the panels away from the frame. The fixing sections described herein are arranged to mechanically secure the panels to the frame, against this pressure.

The skilled person would appreciate that embodiments may therefore reduce the construction time required, as careful gluing of panels, or the like, is not required.

Further, the mechanical attachment may allow the one or more panels to be shipped separately from the rest of the apparatus, or acquired locally, so reducing transportation costs and/or difficulties.

The purely mechanical panel attachment may also facilitate disassembly of the hydrotherapy apparatus, for example for maintenance, repair, or relocation.

In addition, the external mounting of panels onto an inner frame may reduce the number of protrusions and crevices within the tank, so potentially facilitating cleaning and/or reducing the trap risk (e.g. the risk of a dog's paw or human finger becoming trapped).

Features described in relation to one of the above aspects of the invention may be applied, mutatis mutandis, to the other aspect of the invention. Further, the features described may be applied to the or each aspect in any combination.

DESCRIPTION OF THE DRAWINGS

There now follows by way of example only a detailed description of embodiments of the present invention with reference to the accompanying drawings in which.

In the figures, like reference numerals are used for like components.

DETAILED DESCRIPTION OF THE PREFERRED EMBODIMENTS

Figure 1:
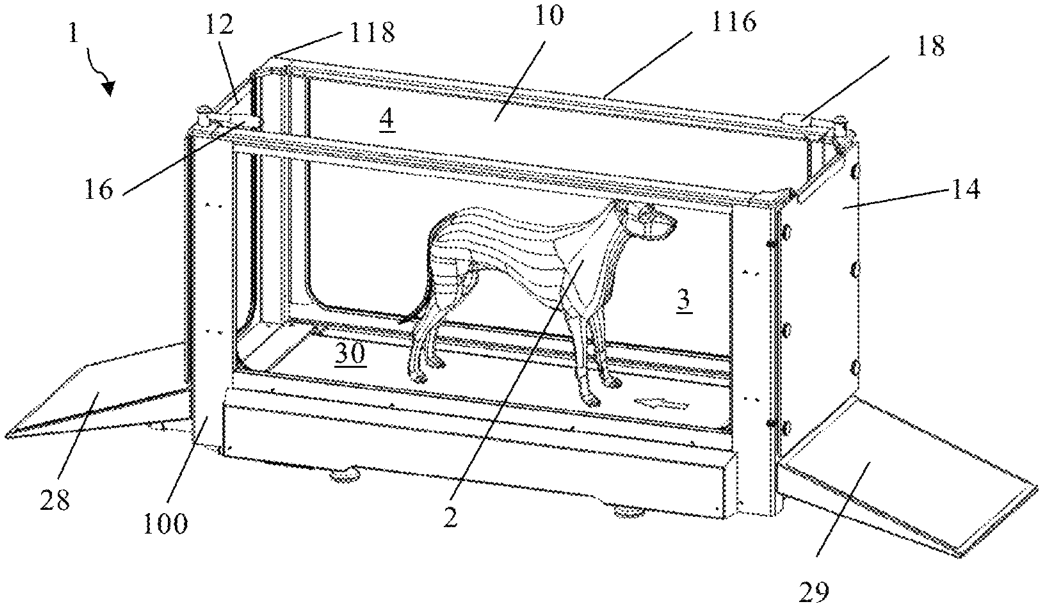
FIG. 1 shows a perspective view of a hydrotherapy apparatus of an embodiment.
Figure 2:
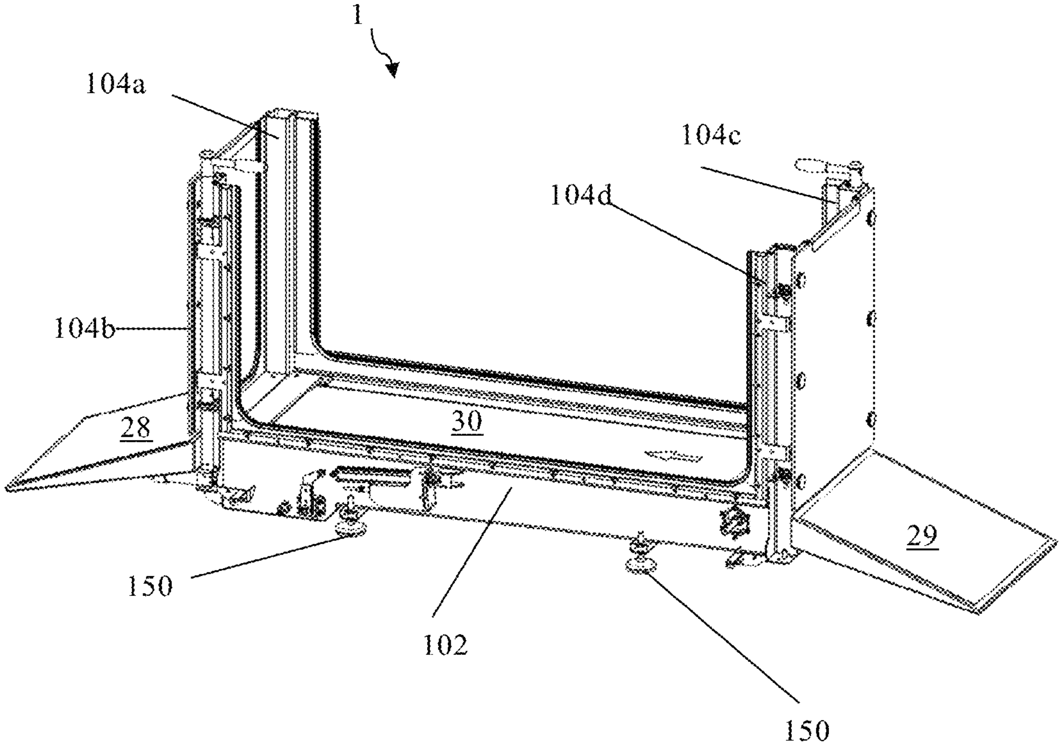
FIG. 2 shows the hydrotherapy apparatus of FIG. 1 with the panels removed.
Figure 3:
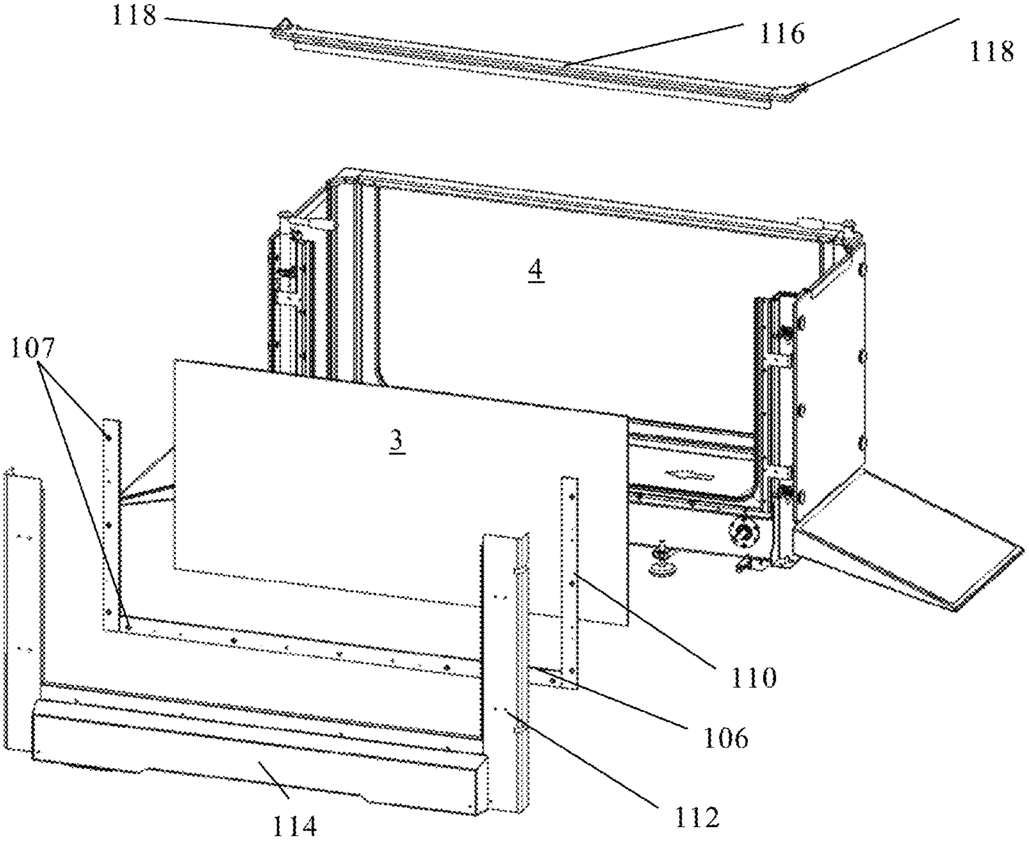
FIG. 3 shows an exploded perspective view of the hydrotherapy apparatus of FIG. 1.

FIG. 1 shows a hydrotherapy apparatus 1 comprising a tank 10. The tank 10 is cuboid in shape in the embodiment shown, with three substantially transparent sides and one opaque side. All sides of the tank 10 may be substantially transparent in other embodiments, or any combination of sides may be translucent or opaque as desired.

The tank 10 is rectangular in plan view and comprises a first door 12 and a second door 14 at each of the minor ends of the tank 10. One door 12 is substantially transparent and the second door 14 is opaque in the example shown—this may vary in other embodiments. Each of the doors 12, 14 has associated therewith a handle 16, 18 which operates a door closing mechanism. In other embodiments, only a single door may be provided. The or each door may have a closing mechanism as described in EP1850825 (B1). The closing mechanism as described therein serves the purpose of allowing access from either outside or inside the tank (therapists often accompany patients) and provides a water tight seal between the door(s) 12, 14 and tank 10.

In the closed position, as shown in FIG. 1, each of the doors 12, 14 forms a water-tight seal with the body of the tank and the tank 10 is, in use, filled with a liquid. Generally this liquid will be water.

A ramp 28 is provided such that an animal or human (hereinafter referred to as a user 2) may easily enter the tank 10. A similar ramp 29 is provided at the opposite end of the tank such that the user 2 may exit the tank 10. Having a door 12, 14 at each end of the tank may be advantageous since it allows a user 2 to enter and exit the tank without having to turn around—the skilled person would appreciate that this may be of particular utility for rehabilitation, where certain movements such as turning may be difficult, and/or for non-human users. A step may be provided instead of a ramp 28 in other embodiments. Optionally, a raised deck may be provided around the tank 10 to reduce the step up (or to reduce ramp length or steepness, if both are present).

The hydrotherapy apparatus 1 of the embodiment shown comprises a conveyer 30 located within the tank 10. The conveyer 30 comprises a belt arranged to move in the direction indicated by the arrow in FIG. 1 (i.e. along the length of the tank 10), so as to provide a moving surface on which the user 2 can walk, jog or run for exercise. In alternative or additional embodiments, the hydrotherapy apparatus 1 may comprise one or more different exercise devices in addition to, or instead of, a conveyer 30.

In the embodiment shown, the substantially transparent side walls 3, 4 of the tank 10 each comprise a panel of glass 3, 4 mounted to an inner frame 100. In alternative embodiments, a panel 3, 4 of a different material may be used instead of glass (e.g. Perspex or metal), and/or the glass may not be transparent.

The inner frame 100 is arranged to have each panel 3, 4 mechanically fixed to it from the outside, so as to form a watertight seal. No sealant, adhesive, or other bonding between the panels 3, 4 and the frame 100 may therefore be required or used.

In the embodiment being described, the inner frame 100 comprises a lower portion 102 in a lower region of the tank 10, which forms a base of the tank 10. In the embodiment shown, the base 102 is not the lowest part of the apparatus 1—feet 150 (which may be adjustable) are mounted on the underside of the base 102 and arranged to support the tank 10. The ramps 28, 29 similarly extend below the level of the base 102 to meet a floor or other surface on which the apparatus 1 is located. In other embodiments, the base 102 may be arranged to rest directly on the ground.

The inner frame 100 further comprises four struts 104*a*, 104*b*, 104*c*, 104*d* extending upward from its lower portion 102. In the embodiment shown, one strut 104 extends upwards at each corner of the rectangular base 102. The inner frame may be made of metal, and in particular may be made of stainless steel.

The inner frame 100 therefore comprises a lower portion, or base, 102 and four struts 104 extending upward therefrom, each strut 104 being located at a corner of the base 102. In the embodiment shown, the struts 104 are each at least substantially perpendicular to the base, such that they are vertical if the base 102 is horizontal.

Figure 4:
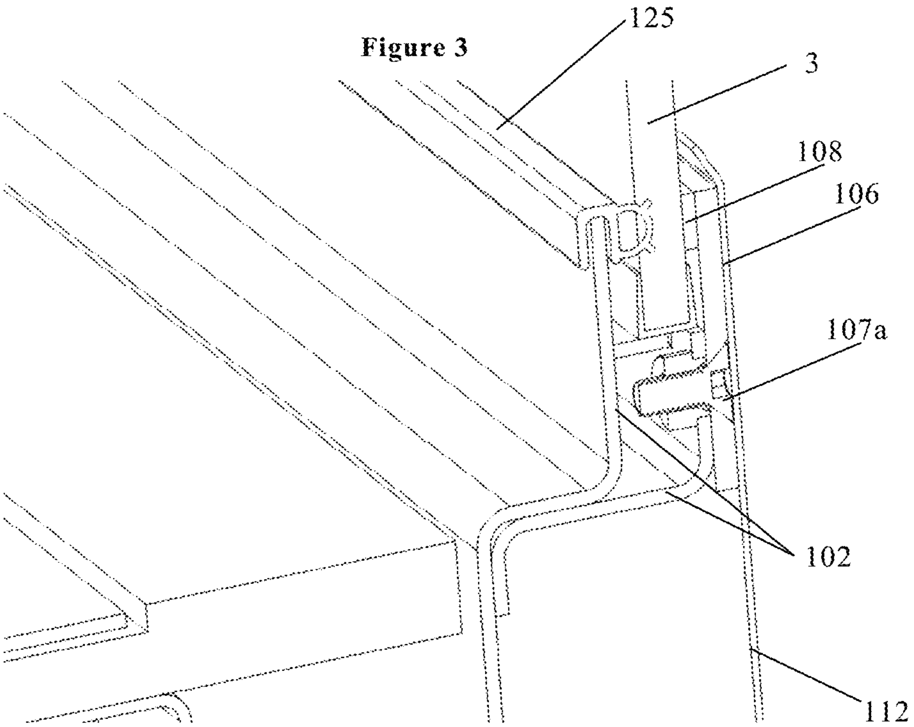
FIG. 4 shows a perspective sectional view of a lower portion of the inner frame of the hydrotherapy apparatus of FIG. 1, in situ.

The tank 10 further comprises a lower fixing section 106 for each panel 3, 4. In the embodiment shown, each lower fixing section 106 takes the form of a rectangular strip, made of metal in this embodiment. Each lower fixing section 106 is arranged to be oriented horizontally in the embodiment shown, along the length of the tank 10. Each lower fixing section 106 is arranged to be mechanically connected to an outer surface of the lower portion 102 of the inner frame 100. A lower edge region of the respective panel 3, 4 is arranged to be received between the lower portion 102 of the inner frame 100 and the lower fixing section 106, so clamping the panel 3, 4 in place, as is shown in more detail in FIG. 4. The lower fixing section 106 is arranged to extend between a respective pair of struts 104*b*, 104*d* between which the panel 3 is to be located.

The lower fixing section 106 and the lower portion 102 of the inner frame 100 each comprise corresponding connectors 107. In the embodiment shown, the connectors 107 comprise holes arranged to align with corresponding holes 107 in the other part 106, 102, and to receive a bolt 107*a* therethrough so as to hold the two parts 106, 102 together. In particular, in the embodiment being described the lower fixing section 106 comprises a set of counter-sunk holes 107 arranged to receive the head of a bolt 107*a* inserted from the outside of the tank 10. The lower portion 102 of the inner frame 100 comprises a corresponding, aligned, set of threaded holes 107 (which may be formed as a part of the inner frame 100, or provided by nuts fixedly attached thereto) arranged to engagingly receive a shaft of the bolt 107*a*. In the embodiment shown, the lower fixing section 106 comprises a metal bar arranged to extend along the length of the tank 10, and having the counter-sunk holes 107 therethrough.

Figure 5:
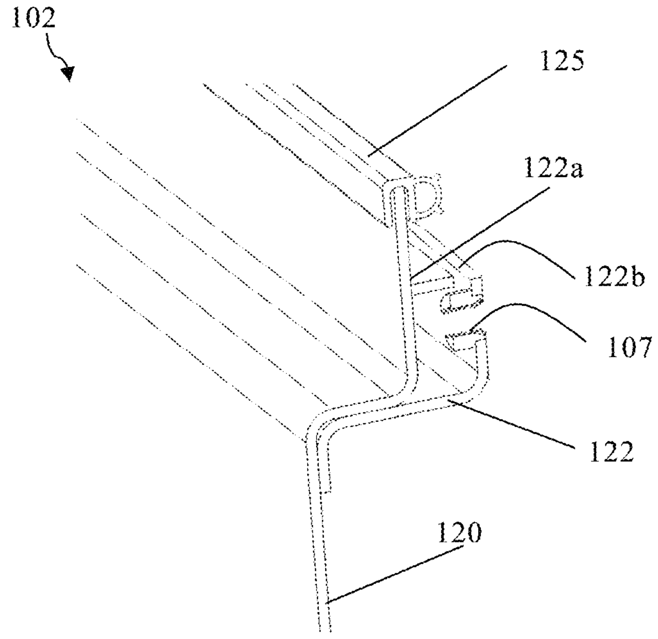
FIG. 5 shows a perspective sectional view of the lower portion of the inner frame of the hydrotherapy apparatus shown in FIG. 5, in isolation.

A perspective view of a cut-away part of the lower portion 102 of the inner frame 100 is shown in FIG. 5. The lower portion 102 includes a first strip 120 arranged to extend along one side of the base of the tank 10, from a lowest region of the inner frame 100 upwards to behind an intended position of a lower edge of the panel 3. The strip 120 has a bend therein, forming an outwardly-directed ledge, before continuing to extend upwards. An upper edge of the strip 120 has an elastomeric seal 125 (e.g. a rubber or silicone seal, or other polymeric seal) mounted thereon. In the embodiment shown, the seal 125 clips onto the upper edge of the strip 120 and extends along the length of the tank 10, between the struts 104*b*, 104*d*. The seal 125 comprises a compressible, outwardly-directed, bulge arranged to contact an inner surface of the panel 3. In the embodiment shown, the seal 125 comprises two outwardly-directed protrusions extending the length of the seal, parallel to and spaced one either side of the apex of the bulge. The apex of the bulge and the two protruding lines may therefore form three lines of contact between the seal 125 and the panel 3. The bulge is hollow in the embodiment shown, but may not be hollow (whilst still being compressible) in other embodiments.

The lower portion 102 includes a second strip 122 mounted on the first strip 120 and similarly extending along the length of the tank 10. In the embodiment shown, the second strip 122 is mounted to the underside of the bend of the first strip (e.g. by welding), and is also welded to the first strip 120 above the bend in the first strip. In other embodiments, the two strips may be formed integrally.

The second strip 122 has an outwardly-directed bend which extends further outward than the bend of the first strip 120. The portion of the second strip 122 extending upwards from its outward bend therefore forms an outermost surface of the lower portion 120. The threaded holes 107 are provided through this outermost surface.

Figure 11:
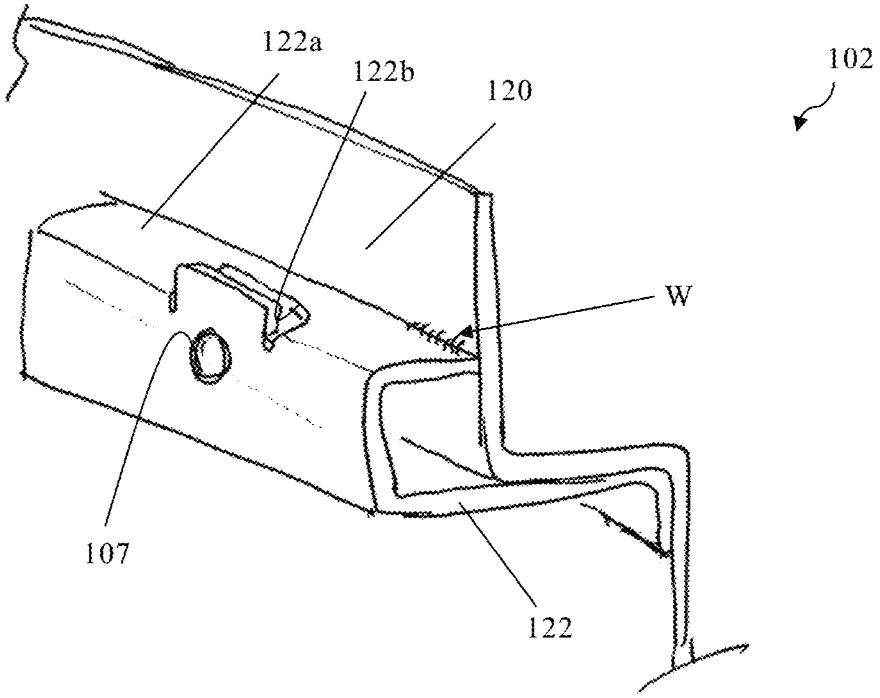
FIG. 11 is a sketch of a perspective view of a lower portion of an inner frame of another embodiment.

Above the outward bends in the first strip 102 and the second strip 122, the second strip 122 bends inwards, towards the first strip 120, becoming at least substantially horizontal and forming a ledge 122*a* extending outwardly from the first strip 120. An edge region of the ledge 122*a* is welded to the first strip 120. The ledge 122*a* is arranged to receive a lower edge of the panel 3 rested thereupon, and is at least substantially horizontal in the embodiment shown. The strip 120 extends upwards beyond the level of the ledge 122*a* (parallel to an inner face of the panel 3 in use). In the embodiment shown, cut-away portions 122*b* are provided in the ledge 122*a* in the regions of the connectors 107—these gaps in the ledge 122*a* do not extend the full length of the ledge 122*a*, but rather only for short distances near the connectors 107 for ease of assembly. FIG. 11 illustrates a similar lower portion 102 of a different inner frame 100, showing a cut-away portion 122*b* more clearly. In the embodiment shown in FIG. 11, the gap 122*b* is formed by the strip 122 being cut and bent, without any material being removed—the material that would have filled the cut-away portion 122*b* in the horizontal ledge 122*a* is instead vertical. As can be seen in this figure, the gap 122*b* extends only in the region of the connector 107. The gaps 122*b* may not be provided in other embodiments. In FIG. 11, the location of the weld, W, between the two strips 120, 122 is indicated in one area by shading.

Once the panel 3 is placed on the ledge 122*a*, the holes 107 of the lower fixing section 106 are aligned with the threaded holes 107 of the second strip 122, and bolts 107*a* are inserted therethrough and tightened, so clamping a lower edge of the panel 3 in place. The outer surface of the upper portion of the second strip 122 is positioned slightly outward of an intended position of the outer surface of the panel 3 in the embodiment being described, so that the inner surface of the metal bar of the lower fixing section 106 does not touch the panel 3. A pad 108 is provided, extending along the length of the tank 120 and arranged to contact the panel 3 level with the seal 125, so protecting the glass panel 3 from the metal lower fixing section 106 in the embodiment shown, and assisting in pressing the panel 3 against the seal 125 once the bolts 107*a* are tightened. In the embodiment being described, the pad 108 is a self-adhesive rubber pad arranged to be mounted on a glass panel 3. The pad 108 may instead be mounted on the fixing section 106 in other embodiments.

The tank 10 further comprises two side fixing sections 110, each extending upward from a respective end of the lower fixing section 106. In the embodiment shown, each side fixing section 110 is substantially rectangular in shape, and oriented vertically. A lower edge of each of the two side fixing sections 110 is at least substantially level with a lower edge of the lower fixing section 106 in the embodiment shown, and one side fixing section 110 is placed at either end of the lower fixing section 106. In alternative embodiments, the side fixing sections 110 may be located entirely above the lower fixing section 106, for example with a lower edge of each of the two side fixing sections 110 resting on top of, or spaced vertically from, an upper edge of the lower fixing section 106.

Each side fixing section 110 is arranged to be mechanically connected to an outer surface of a respective strut of the struts 104 of the inner frame 100. Each side fixing section 110 comprises a metal bar with holes therethrough arranged to receive bolts 107*a* in the embodiment being described. The struts 104 each have corresponding holes, so forming a mechanical connection between the strut 104 and the respective side fixing section 110 when bolts 107*a* are inserted, as for the lower fixing section 106.

As for the lower fixing section 106, in the embodiment being described the side fixing section 110 comprises counter-sunk holes 107 each arranged to receive a head of a bolt 107*a*, and the struts 104 comprise threaded holes 107 each arranged to receive a shaft of the bolt 107*a* (e.g. having nuts mounted thereon). In alternative embodiments, the inner frame 100 may comprise threaded shafts extending therefrom, and nuts may be tightened onto the shafts from outside the fixing sections 106, 110, or a different form of connector known to the skilled person may be used.

Each side fixing section 110 is therefore arranged to be mechanically connected to a strut 104, with a respective side edge region of the panel 3 clamped therebetween.

In the embodiment shown, the side fixing sections 110 comprise metal bars with bolt holes 107 therethrough. In the embodiment shown, a pair of side fixing sections 110 is connected to each lower fixing section 106 (e.g. by welding), one in each end region thereof, so forming a single until to be attached to the outside of the inner frame 100. In alternative embodiments, one or both of the side fixing sections 110 may be provided separately from the lower fixing section 106, or an integrally formed single fixing section may be provided for the lower portion and sides.

Figure 10:
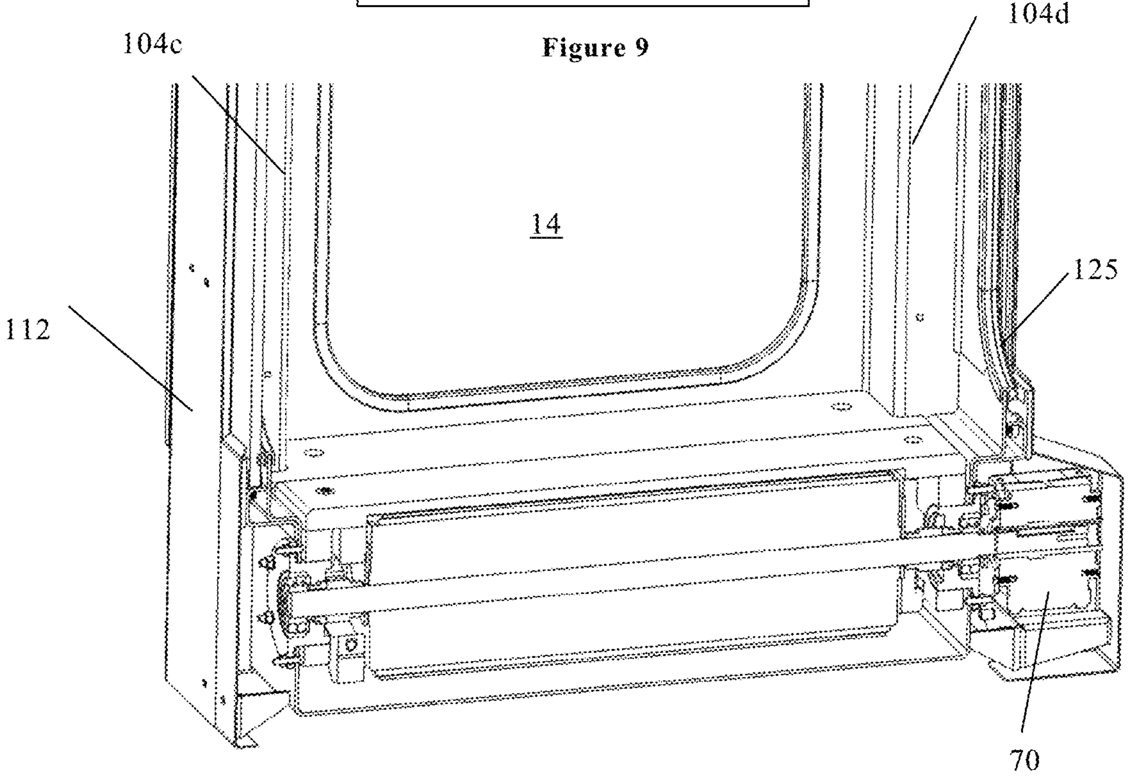
FIG. 10 is a sectional perspective view of a portion of the hydrotherapy apparatus of FIG. 1.

In the embodiment being described, the inner frame 100 comprises smooth, curved corners from the upper edge of the first strip 120 to the struts 104, so forming a broad U-shaped edge as shown in FIG. 10. A single seal 125, or continuous sequence of seals 125, may therefore extend from the top of one strut 104*b*, down the height of the strut, around the smooth corner, along the length of the base 102, and back up to the top of a second strut 104*d*, forming a continuous seal against the panel 3 once the panel 3 is inserted.

As for the lower fixing section 106, each side fixing section 110 of the embodiment being described includes an inwardly-facing pad or seal 108 extending along the height of the tank 10 and arranged to contact the panel 3 level with the seal 125, so pressing the panel 3 against the seal once the bolts 107*a* are tightened.

The fixing sections 106, 110 are therefore arranged to clamp the panel 3 to the inner frame 100.

In the embodiments shown, the hydrotherapy apparatus 1 further comprises one or more external trims 112 arranged to cover the fixing sections 106, 110. The trims 112 may be provided for aesthetic reasons (e.g. covering bolts 107*a*), and/or may provide a functional purpose such as protecting the bolts 107*a* or other components and/or reducing the risk of injury or trapping by covering non-smooth surfaces.

In the embodiments shown, on one side of the hydrotherapy apparatus 1, the trim 112 comprises a box 114 extending outwardly therefrom. The box 114 is arranged to contain, protect, and/or conceal one or more system components such as a gearbox and motor 70 arranged to drive a belt of the conveyer 30. In some embodiments, such a box 114 may be provided on both sides, or may not be provide at all. A motor 70 may be provided without a gearbox in other embodiments.

In the embodiments shown, the hydrotherapy apparatus 1 further comprises a top rail 116 arranged to lie along and contact a top surface and an outer surface of an upper edge region of the panel 3. The top rail 116 comprises a metal sheet which extends along the length of the panel 3 and is folded to provide a hollow bar extending along the top of the panel 3, and a downwardly-directed portion extending below the bar, parallel and adjacent to an outer surface of the panel 3. Using a folded sheet to form a hollow bar rather than a solid bar may reduce apparatus weight whilst still providing a sturdy and convenient rail for a user.

The top rail 116 is arranged to be mounted onto the struts 104 of the inner frame 100, and more specifically between the pair 104*b*, 104*d* of struts on either side of the panel 3. The top rail 116 is not connected to the panel 3 in the embodiment being described, but contacts the panel 3 and pushes a top edge region of the panel 3 inwards, so reducing or avoiding outward bowing of the panel 3 when the tank 10 is filled with water. In the embodiment shown, the downwardly-directed portion of the metal sheet of the top rail 116 does not itself touch the panel 3—rather, a pad or seal 117 is located on an inward-facing surface of the downwardly-directed portion and arranged to contact the panel 3. In the embodiment shown, the pad or seal 117 extends along the full length of the panel 3. In alternative embodiments, multiple separate spaced, pads may be provided instead of, or as well as, a continuous pad.

The hydrotherapy apparatus 1 comprise two top rails 116 in the embodiment shown one for each panel wall 3, 4.

Each end of each top rail 116 is arranged to be connected to a respective strut 104 of the inner frame 100, and more specifically to screwed onto the top of a respective strut 104 of the inner frame 100 in the embodiment being described. Connectors may vary in other embodiments.

Figure 8:
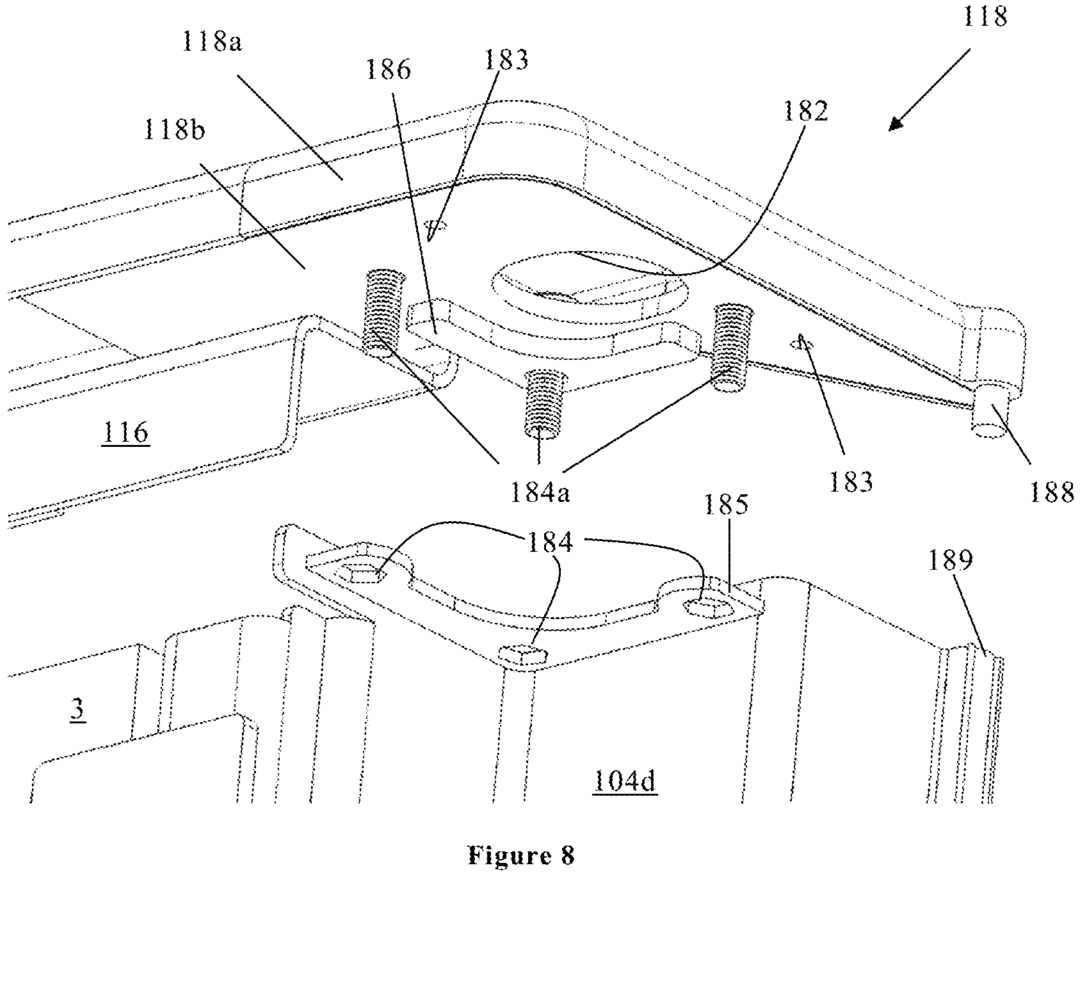
FIG. 8 shows an exploded perspective view of the join between the top rail and a strut of the inner frame.

The connector 118 of the embodiment being described is shown in more detail in FIG. 8. The connector 118 includes a body portion which extends into the hollow bar of the top rail 116 and is connected thereto. The connector 118 forms a corner-piece, with a cover 118*a* of the connector 118 providing a smooth, continuous surface continuing from the top rail 116 to the door 12, 14. The cover 118*a* may be formed of moulded plastic arranged to fit engagingly onto a body portion 118*b* of the connector. In alternative embodiments, the separate cover 118*a* may not be provided.

In the embodiment being described, the body portion 118*b* of the connector 118 is a metal plate which is welded to the top rail 116 in use. The metal plate 118*b* may be referred to as an end plate, or corner plate, as it forms a corner of, or end to, the top rail 116. The cover 118*b* may be made of a softer material, such as a compressible plastic, to provide a comfortable grip and/or reduce the risk of injury. The cover 118*b* may be connected to the body portion 118*b* in any suitable manner—one or more holes 183 for screws or the likes are provided through the body portion 118*b* in the embodiment shown in the figures. The holes 183 may be arranged to be accessible from below, so providing a smooth outer, upper, surface for the corner piece 118.

The connector 118 is connected to the strut 104*d* by means of bolts or screws extending through the body portion 118*b* of the connector 118 downward into nuts or other threaded holes integrally formed with, or mounted on, the strut 104*d*. In alternative embodiments, the body portion 118*b* may instead comprise nuts arranged to be tightened onto bolts extending from the strut 104*d*, or an alternative connector.

In the embodiment being described, each strut 104 is hollow and substantially cuboid in shape when the tank 10 is complete. The inner frame 100 provides two complete sides of the cuboid shape and one or more L-shaped bars 181 for the other two sides. The trim 112, which may be in part mounted on the L-shaped bars 181, may effectively provide the outer two sides of the strut once assembled.

As shown in FIG. 8, an L-shaped plate 185 extends inwards from the inner surfaces of the strut 104. The plate 185 comprises three apertures 184, each shaped to engagingly receive a nut. Three bolts 184*a* extend downwardly from the connector 118, through the apertures 184, and the nuts (not shown) and bolts 184*a* can then be tightened to hold the connector 118 in place on the strut 104. A different number or position of bolts 184*a*, or a different overall connector design, may be used in other embodiments.

In the embodiment shown, a formation 186 is provided on the underside of the connector 118. The formation 186 protrudes downwards and may therefore be described as a protrusion. The formation 186 is sized and shaped to be engagingly received within the strut 104. As the formation 186 fits snugly within the top of the hollow strut 104, stresses in the connection may be more evenly distributed, reducing the stress on the individual bolts 184*a*. In various embodiments, the upper end region of each strut 104 may comprise one or more indentations or apertures, and one or more downwardly-extending protrusions at each end of the top rail 116 (provided on a connector 118 as shown, or directly formed as part of the rail 116 in other embodiments) may be arranged to be engagingly received within the respective strut 104.

Figure 6:
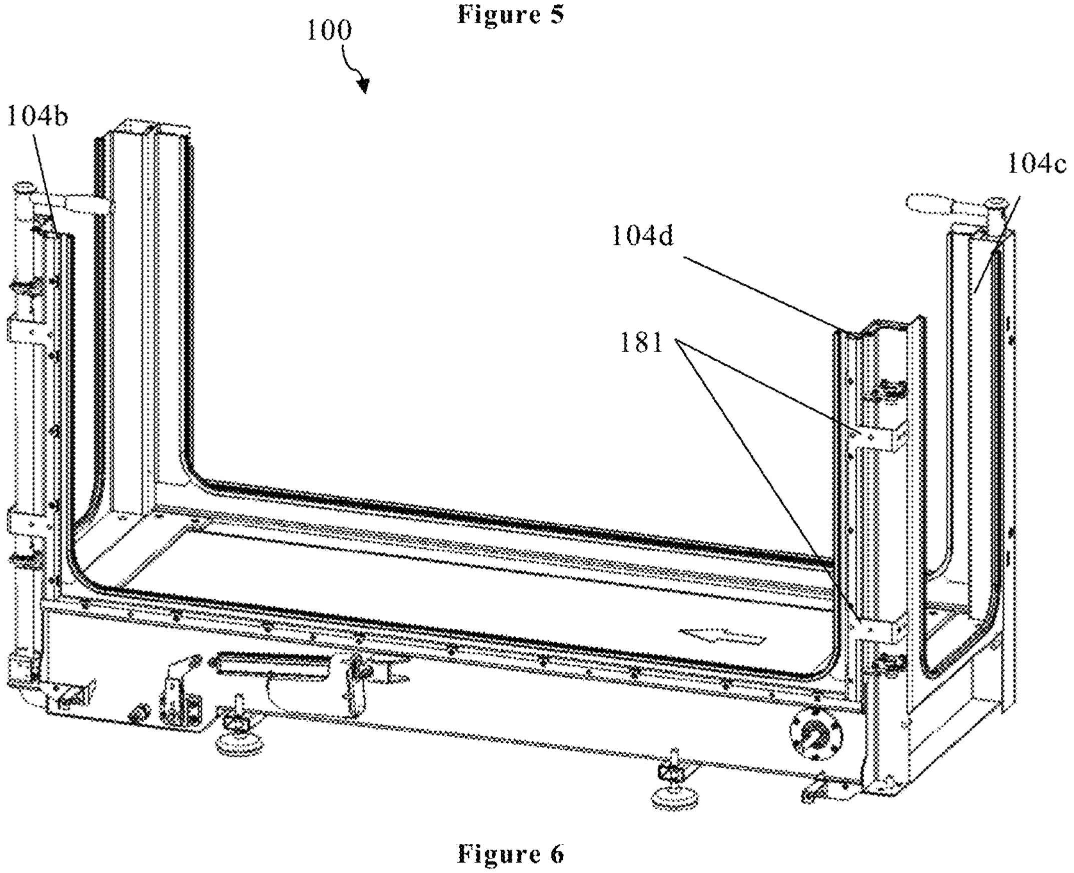
FIG. 6 shows the inner frame of the hydrotherapy apparatus of FIG. 1.
Figure 7:
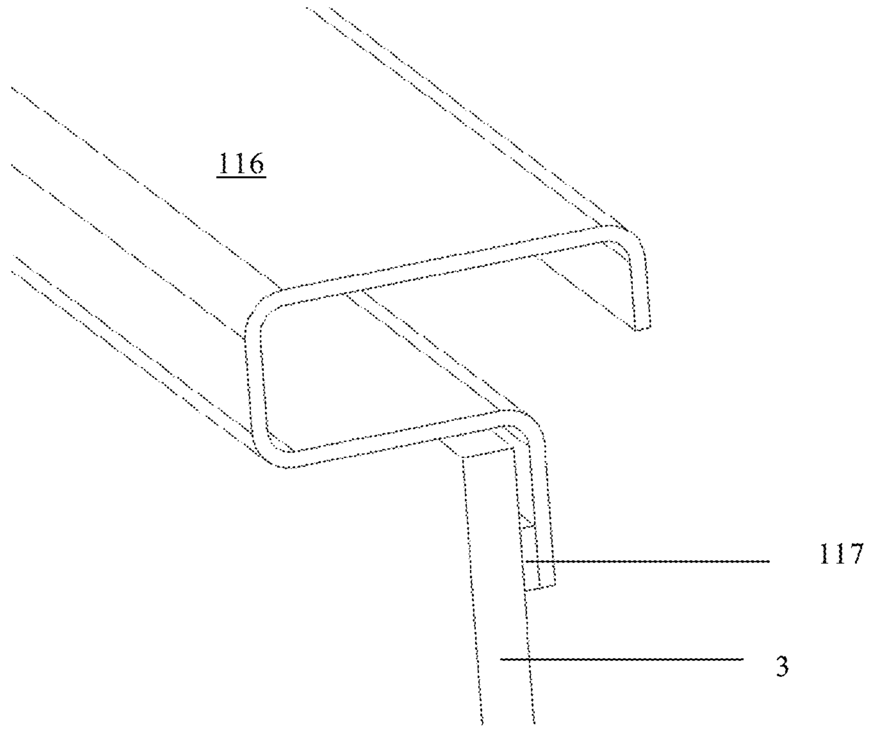
FIG. 7 shows a perspective sectional view of the top rail mounted on a panel.

In the embodiment being described, the body of the connector 118 comprises an aperture 182 therethrough. The aperture 182 is arranged to allow a door opening/closing mechanism to extend therethrough, within the hollow strut 104, as shown for struts 104*b* and 104*c* in FIG. 6, for example. In the example shown in FIG. 8, the connector 118 is for a strut 104*d* which does not have a door opening mechanism, and therefore the aperture 182 is not needed. The cover of this connector 118 has no aperture therethrough, so providing a smooth external surface. In alternative embodiments, a different connector 118, with no aperture 182, may be provided.

In the embodiment being described, the body 118*b* of the connector 118 comprises a downwardly-directed peg 188. The peg 118 is arranged to be received within the hollow portion of a seal 189 located around the door 14. The seal 189 has the same form as the seal 125 provided for the panel 3 and described above in the embodiment shown, although a different seal may be used in other embodiments. The peg 188 may therefore protect the top of the seal 189—both helping to hold it in place and preventing water from entering into it. A similar peg (not shown) may be provided in the top of the seal 125 provided for the panel 3.

The hydrotherapy apparatus 1 shown in the drawings comprises a total of four tank sides—two of which are doors 12, 14, and the other two of which are walls formed with mechanically-mounted panels 3, 4. In the embodiment shown, the tank 10 is cuboid in shape, the short sides are doors 12, 14 and the long sides are walls 3, 4. The tank 10 comprises four struts 104, one at each corner of the cuboid tank 10, and each panel 3, 4 forms one wall of the at least substantially cuboid tank 10. Each panel 3, 4 is mounted to the inner frame 100 in the same way. In alternative embodiments, all four sides of the tank 10 may be provided by such panels 3, 4 mounted in this way (e.g. a tank with no door—entry from above), three walls may be provided by such panels, or only one wall may be provided by such a panel. In alternative embodiments, for example for a longer tank 10, each panel wall may comprise multiple panels—e.g. two or three panels. In such embodiments, additional struts 104 may be provided spaced along the side(s) of the tank 10, in order to provide watertight joins between panels.

The skilled person would appreciate that, for known hydrotherapy apparatuses, gluing in the glass panels constitutes a significant part of the work needed in constructing the apparatus, and requires suitable skill and equipment. Using mechanical mounting of the panels 3, 4 as described herein may therefore facilitate assembly and disassembly, so allowing kits of parts for the apparatus to be sold and shipped for local assembly more easily. In particular, glass panels 3, 4 are large, heavy, breakable, and relatively difficult to ship. A kit of parts excluding the panels may therefore be provided, and glass panels 3, 4 may be acquired locally by a purchaser for assembly.

In particular, a kit of parts for constructing a hydrotherapy apparatus 1 comprising a tank 10 may be provided. The kit of parts comprises an inner frame 100 as described above—the inner frame 100 generally being provided in parts for ease of shipping (e.g. with the struts 104 detached from the base 102). When assembled, the inner frame 100 is arranged to form a base 102 of the tank 10 with the struts 104 defining corner edges extending upwards therefrom.

The kit of parts further comprises one or more fixing sections 106, 110 arranged to be connected to the inner frame 100 from the outside.

One or more panels 3, 4, whether provided with the kit of parts or obtained separately, may then be mechanically fixed to an outer surface of the inner frame 100. The panels 3, 4 therefore form walls of the tank 10, with a watertight seal being formed without requiring any sealant/bonding.

The kit of parts may include one U-shaped fixing section per panel (comprising integrated lower 106 and side 110 fixing sections), or may include separate fixing sections for each edge of the panel 3, 4 to be clamped (e.g. three fixing sections).

Figure 9:
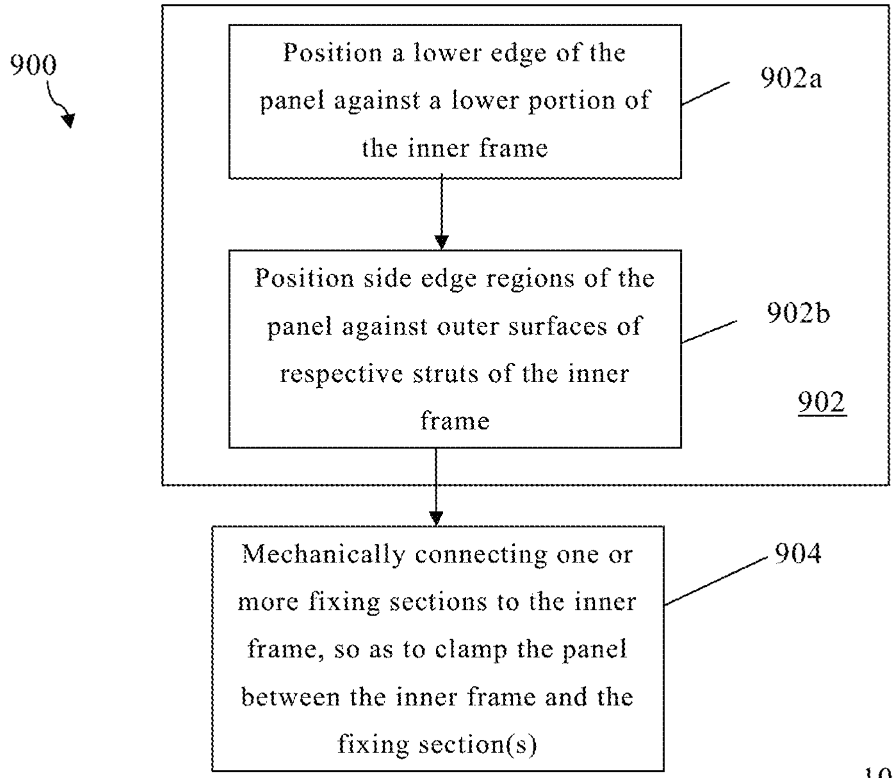
FIG. 9 is a flow-chart illustrating a method of an embodiment.

The kit of parts may be assembled/the hydrotherapy apparatus 1 may be assembled using the method 900 described below with respect to FIG. 9.

The method 900 comprises mechanically connecting a panel 3, 4 to the outside of an inner frame 100 of the tank 10, so as to form a wall of the tank 10.

More specifically, the method 900 of the embodiment being described comprises positioning 902 the panel 3 against an outer surface of the inner frame 100.

The positioning 902 may comprise positioning **902*a* a lower edge of the panel 3 against an outer surface of the lower portion 102 of the inner frame 100 and positioning 902*b* side edge regions of the panel 3 against outer surfaces of respective struts 104*b*, 104*d* of the inner frame 100. The struts 104 extend upward from the lower portion 102 of the inner frame. The two positioning steps 902*a*, 902*b*** may be performed in either order, or simultaneously.

Once the panel 3 is in position, the method 900 comprises mechanically connecting 904 one or more fixing sections 110, 106 to the lower portion 102 and struts 104 of the inner frame 100, so as to clamp the panel 3 between the inner frame 100 and the fixing section(s) 106, 110. The connecting step 904 may comprise inserting and tightening multiple bolts and/or screws.

In various embodiments, the order of these steps may vary. For example, a lower edge region of the panel 3 may be rested **902*a* on the ledge 122*a* provided by the lower portion 102 of the inner frame 100, optionally with the panel 3 angled upwards and outwards from the ledge 122*a*, with respect to the tank 10. The lower fixing section 106 may be loosely attached to the lower portion 102 of the inner frame 100, for example to prevent the panel 3 from slipping off the ledge 120*a***, at this stage or later.

The panel 3 may then be pushed upright, rotating around its lower edge which rests on the ledge **122*a*, until it lies flat against the inner frame 100 (vertical, in the orientation shown). The lower fixing section 106** may then be secured more tightly in place, if already loosely positioned, or may be positioned and secured in place, if not already positioned.

The side fixing sections 110 may then be positioned and secured in place, after the lower fixing section 106.

The fixing sections 106, 110 therefore clamp the panel 3 to the inner frame 100.

Other step orders may be implemented in other embodiments, without departing from the scope of the disclosure.

In the embodiment being described, the method 900 further comprises, prior to positioning 902 the panel 3, clipping one or more elastomeric seals 125 to the inner frame 100. The one or more elastomeric seals 125 may be arranged to extend outwardly from the inner frame 100 so as to contact (and be compressed against) the panel 3 once fitted. In alternative embodiments, the inner frame 100 (or the panel 3) may be provided with one or more elastomeric seals 125 already present thereon/integral therewith, and so this step of attaching one or more seals may not be performed on assembly.

In embodiments with a top rail 116, the top rail may be added from above the tank 10 after all fixing sections 106, 110 have been secured in place, and before the tank 10 is filled.

In the embodiment being described, the method 900 further comprises, after positioning 902 the panel 3, connecting a top rail 116 between two struts 104 of the inner frame 100, along the top of the panel 3. The top rail 116 is arranged to contact an outer surface of an upper edge region of the panel 3, so exerting an inwardly-directed force which can counterbalance the outward force of water pressure once the tank 10 is filled with water (or equivalently with another liquid).

The method 900 as described herein allows panels 3, 4 to be mounted on a frame 100 so as to form a watertight tank 10 without the use of any adhesive, sealant, or heat or pressure treatment to bond the panel to the inner frame. Whilst a sealant or the like could be used in addition, this is not necessary. The avoidance of a sealant or similar may facilitate assembly—reducing the time and/or specialist equipment required—and/or may allow the apparatus 1 to be more easily disassembled and reassembled, e.g. for maintenance, repair, and cleaning.

The skilled person would appreciate that different mechanical connectors may be used, following the same principles, without departing from the scope of the invention.

We claim:

1. A hydrotherapy apparatus comprising a tank arranged to hold a liquid, the tank comprising:

a panel arranged to form a wall of the tank, an inner frame arranged to have the panel connected thereto, the inner frame comprising a lower portion in a base region of the tank and two struts extending upward therefrom;

a lower fixing section arranged to be mechanically connected to an outer surface of the lower portion of the inner frame, with a lower edge region of the panel clamped therebetween; and two side fixing sections extending upward away from the lower portion of the inner frame and each arranged to be mechanically connected to an outer surface of a respective strut of the struts of the inner frame, with a respective side edge region of the panel clamped therebetween.

2. The hydrotherapy apparatus of claim 1, further comprises a door arranged to allow a user to enter the tank, in addition to the wall.

3. The hydrotherapy apparatus of claim 1, wherein the inner frame comprises a ledge arranged to receive and support the lower edge region of the panel thereon.

4. The hydrotherapy apparatus of claim 1, further comprising a top rail arranged to contact an outer surface of an upper edge region of the panel, and to be mounted onto the struts of the inner frame.

5. The hydrotherapy apparatus of claim 4, wherein each end of the top rail is arranged to be screwed onto the top of a respective strut of the inner frame.

6. The hydrotherapy apparatus of claim 4, wherein each strut is hollow or comprises one or more indentations in an upper surface thereof, and wherein a downwardly-extending protrusion at each end of the top rail is arranged to be engagingly received within the respective strut.

7. The hydrotherapy apparatus of claim 1, further comprising one or more elastomeric seals arranged to clip onto the inner frame and extend outwardly therefrom to contact the panel, so forming a watertight seal between the panel and the inner frame.

8. The hydrotherapy apparatus of claim 1, further comprising one or more external trims arranged to cover the fixing sections.

9. The hydrotherapy apparatus of claim 1, further comprising two panels each arranged to form one wall of an at least substantially cuboid tank, each panel being mounted to the inner frame in the same way.

10. The hydrotherapy apparatus of claim 1, wherein the inner frame comprises a base and four struts extending upward therefrom, each strut being located at a corner of the base.

11. The hydrotherapy apparatus of claim 1, wherein at-last-one the panel is a glass panel.

12. The hydrotherapy apparatus of claim 1, further comprising a conveyer located within the tank.

13. A kit of parts for constructing a hydrotherapy apparatus having a tank, the kit of parts comprising:
- an inner frame arranged to have a panel connected thereto so as to form a wall of the tank, the inner frame comprising a lower portion in a base region of the tank and two struts extending upward therefrom;
- a lower fixing section arranged to be mechanically connected to an outer surface of the lower portion of the inner frame, and arranged to clamp a lower edge region of the panel therebetween in use; and
- two side fixing sections, each arranged to be mechanically connected to an outer surface of a respective strut of the struts of the inner frame so as to extend upwards away from the lower portion of the inner frame; and arranged to clamp a respective side edge region of the panel therebetween in use.

14. The kit of parts of claim 13, further comprising a conveyer arranged to be located within the tank.

15. The kit of parts of claim 13, wherein the inner frame comprises a ledge arranged to receive and support the lower edge region of the panel thereon.

16. The kit of parts of claim 13, further comprising a top rail arranged to contact an outer surface of an upper edge region of the panel, and to be mounted onto the struts of the inner frame.

17. The kit of parts of claim 16, wherein each end of the top rail is arranged to be screwed onto the top of a respective strut of the inner frame.

18. The kit of parts of claim 13, further comprising one or more elastomeric seals arranged to clip onto the inner frame and extend outwardly therefrom to contact the panel, so forming a watertight seal between the panel and the inner frame.

19. A hydrotherapy apparatus tank, the tank comprising: a door arranged to allow a user to enter the tank; a panel arranged to form a wall of the tank, wherein the panel is a transparent panel; and an inner frame arranged to have the panel mechanically fixed to an outer side thereof by clamping, without bonding, so as to form a watertight seal, wherein the inner frame comprises a lower portion in a base region of the tank and two struts extending upward therefrom, and the hydrotherapy apparatus further comprises: a lower fixing section arranged to be mechanically connected to an outer surface of the lower portion of the inner frame, with a lower edge region of the panel clamped therebetween; and two side fixing sections extending upward away from the lower portion of the inner frame and each arranged to be mechanically connected to an outer surface of a respective strut of the struts of the inner frame, with a respective side edge region of the panel clamped therebetween.

* * * * *